United States Patent [19]

Ellis

[11] 4,046,694
[45] Sept. 6, 1977

[54] APPARATUS FOR SEPARATING PARTICULATE SOLIDS FROM LIQUIDS

[75] Inventor: John Frederick Ellis, Preston, England

[73] Assignee: United Kingdom Atomic Energy Authority, London, England

[21] Appl. No.: 458,043

[22] Filed: Apr. 4, 1974

[30] Foreign Application Priority Data

Feb. 1, 1974 United Kingdom ............... 4868/74

[51] Int. Cl.² ............................................. B01D 35/20
[52] U.S. Cl. ................................ 210/297; 209/269; 209/368; 210/388
[58] Field of Search ............... 210/259, 260, 261, 262, 210/319, 388, 389, 391, 297; 209/269, 274, 311, 365, 382, 368, 255

[56] References Cited

U.S. PATENT DOCUMENTS

| 697,353 | 4/1902 | McDermott | 209/269 |
|---|---|---|---|
| 830,349 | 9/1906 | Meurer | 210/388 |
| 2,293,978 | 8/1942 | Jonsson | 209/269 |
| 2,505,513 | 4/1950 | Young et al. | 210/388 X |
| 2,883,051 | 4/1959 | Maeder | 209/269 |
| 3,124,530 | 3/1964 | Jakobs | 210/389 |
| 3,446,349 | 5/1969 | Bonzm | 209/382 X |
| 3,483,974 | 12/1969 | Pearsall | 209/382 X |
| 3,833,123 | 9/1974 | Walker | 210/391 |

Primary Examiner—Theodore A. Granger
Attorney, Agent, or Firm—Larson, Taylor and Hinds

[57] ABSTRACT

Apparatus for the separation of particulate solids from a liquid and comprising a container, a first declivous draining screen located within the container to separate upper and lower regions of the container, means including a subsidiary declivous draining screen steeper than the first screen for feeding a mixture of particulate solids and liquids on to the upper end of the first screen, baffles on the underside of the first screen to discourage adherence of liquid beneath the first screen, a weir disposed at the lower end of the first screen for allowing the controlled passage of solids thereover, means for withdrawing liquid from the lower region of the container, and means for vibrating the container to move solids along the first screen and over the weir.

3 Claims, 1 Drawing Figure

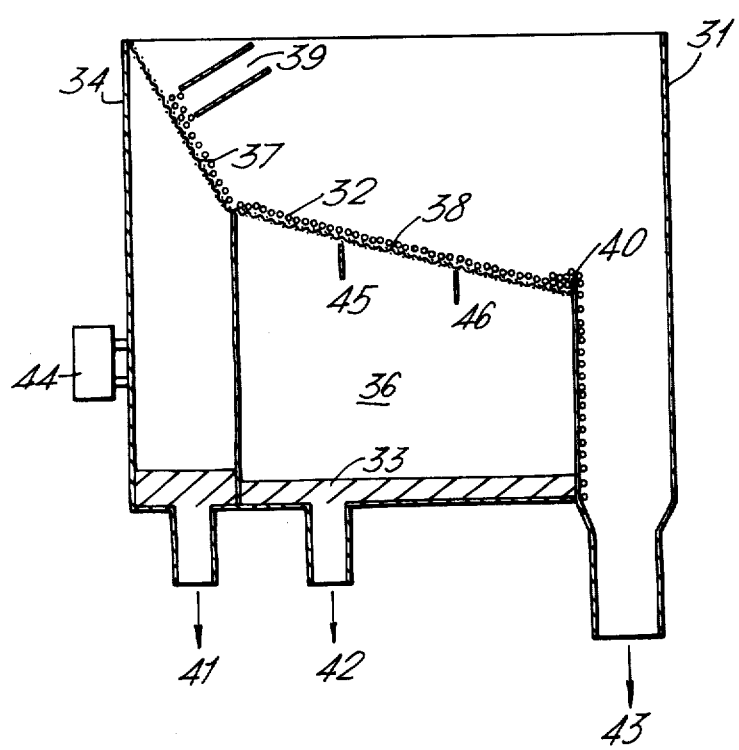

APPARATUS FOR SEPARATING PARTICULATE SOLIDS FROM LIQUIDS

BACKGROUND OF THE INVENTION

This invention relates to apparatus for separating particulate solids from liquids and seeks to provide apparatus for the separation of spheroidal nuclear fuel particles formed by gel precipitation from process liquids such as ammonia which is used as a precipitating medium in the gel precipitation process and water which is used for washing the particles after precipitation. It is also suitable for the separation of solids containing radioactive materials where it is desirable to minimise hold up of the solids.

SUMMARY OF THE INVENTION

According to the invention apparatus for the separation of particulate solids from a liquid comprises a container, a first declivous draining screen located within the container to separate upper and lower regions of the container, means including a subsidiary declivous drainging screen steeper than the first screen for feeding a mixture of particulate solids and liquid on to the upper end of the first screen, baffles on the underside of the first screen to discourage adherence of liquid beneath the first screen, a weir disposed at the lower end of the first screen for allowing the controlled passage of solids thereover, means for withdrawing liquid from the lower region of the container, and means for vibrating the container to move solids along the first screen and over the weir.

DESCRIPTION OF THE DRAWING

An embodiment of the invention will now be described by way of example with reference to the accompanying drawing which is a diagrammatic side view.

DESCRIPTION OF A PREFERRED EMBODIMENT

The drawing shows apparatus 31 for the separation of particulate solids 32 which are gel precipitated spheres from a liquid 33 which is water. A first draining screen 38 set at an angle of at least 10° and preferably 15° to the horizontal within a container 34 separates upper and lower regions 35, 36 of the container. A supply duct 39 is provided to feed a mixture of solids and liquid on to a subsidiary draining screen 37 set at at least 60° to the horizontal, the subsidiary screen directing the mixture onto the upper end of the first screen 38. The screens 37, 38 are constructed from framed wire mesh held in position by appropriately sited support struts (not shown). At the lower end of the first screen 38 is a weir 40. Outlets 41, 42 are provided for removing liquid from the base of the container 34 and outlet 43 discharges drained solid product. A hammer type vibrator 44 is bolted directly on to lugs welded to the container 34 in such a way as to effect the maximum transfer of energy into the container 34. Short strip metal baffles 45, 46 are provided underneath the screen 38 to discourage the adherence of liquid to the screen.

In operation a mixture of solids 32 and liquid 33 are fed from the supply duct 39 on to the more steeply angled screen 37. Significant quanitites of liquid drain thereform through the outlet 41. Under the action of the vibrator 44 solids proceed along the screen 38 to the weir 40 and product discharge outlet 43, the greater part of the liquid being drained off and removed through the outlet 42. Liquid which has tracked beneath the screen 38 is diverted by the baffles 45, 46 and is thereby prevented from attaining the area of the weir where it might be reattracted to the separated solids. This would impair the efficiency of separation.

The apparatus described is of general application for the separation of spheroidal particulate solids from a liquid in which they are dispersed by the choice of an appropriately sized screen of chemically compatible material.

I claim:

1. Apparatus for the separation of particulate solids from a liquid, the apparatus comprising a container, a first generally planar declivous draining screen located within the container to separate upper and lower regions of the container, means including a subsidiary generally planar declivous draining screen disposed above, inclined in the same sense as, but steeper than, the first screen for feeding a mixture of particulate solids and liquid onto the upper end of the first screen, baffles on the underside of the first screen transverse to the direction of movement of the solids to discourage adherence of liquid beneath the first screen, a weir in the form of a generally vertical barrier upstanding abruptly from and disposed at the lower end of the first screen for allowing the controlled passage of solids thereover, means for withdrawing liquid from the lower region of the container substantially below the lowest part of either screen to ensure that the screens are above the level of any liquid in the container, and means for vibrating the container to move solids along the first screen and over the weir.

2. Apparatus as claimed in claim 1 for the separation of particulate solids from a liquid wherein the first draining screen is set at an angle of 15° to the horizontal.

3. Apparatus as claimed in claim 1 for the separation of particulate solids from a liquid wherein the subsidiary draining screen is set at an angle of at least 60° to the horizontal.

* * * * *